2,766,656

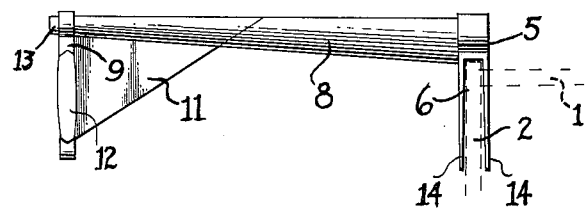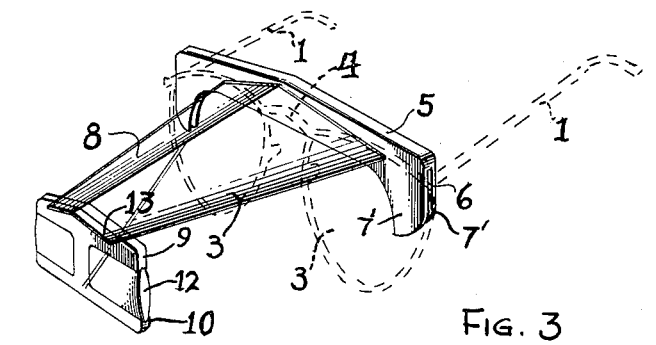

LOUPE MOUNTING

Jacob Better, Toronto, Ontario, Canada

Application February 26, 1953, Serial No. 339,109

3 Claims. (Cl. 88—41)

This invention broadly relates to binocular loupes such as are worn by medical men, craftsmen, philatelists and others who occupy themselves with small, fine work and serves to magnify their fields of operation, in the interest of greater efficiency. More specifically, the invention relates to a binocular loupe which is adapted to be worn by such people who are also obliged to wear vision-corrective glasses or spectacles in addition thereto.

Basically, a loupe of the character herein visualized essentially comprises a pair of lenses adapted to be positioned a few inches in front of the wearer's eyes, being mounted in a frame secured in any one of several ways to the wearer's head, usually by means of ear-engaging bows or temples. However, people who require loupes very often also require spectacles in addition thereto, and it is to these that the present invention is specifically addressed, the loupe in this case forming part of a mounting which is adapted to engage the spectacles and to be supported thereby.

It is an object of the invention to provide a loupe mounting which may be mounted on ordinary spectacles without requiring any modification of the latter, and which may be mounted on or removed from the spectacles without removing the latter from wearing position and without the necessity of employing tools or the making of any adjustments whatsoever.

A further object is to devise a loupe mounting which will possess marked rigidity and thus prevent movement of the magnifying lenses relative to the spectacle rims or lenses.

A still further object is to devise a loupe mounting which will not interfere with or shade the work by casting shadows thereon.

Another object is to devise a loupe mounting of the present character which does not completely fill the wearer's visual field and thus enables him to employ unmagnified vision wherever necessary without craning his neck, or straining his eyes and without partial or complete removal of the loupe.

Another object is to devise a loupe mounting which can be mounted on a pair of spectacles without scratching or damaging the lenses forming a part thereof.

Another object is to devise a loupe mounting which will comprise a minimum number of parts, which is simple to construct and which is comparatively inexpensive.

These and other objects which will hereinafter appear are attained by constructing the loupe mounting with a transverse bar adapted to be detachably mounted and frictionally retained on a spectacle frame and from which a carrier member extends forwardly; the magnifying lenses being arranged at the free or front end of said carrying member. The underside of the transverse bar is longitudinally channelled to receive the tops of the rims or lenses of the spectacles without unduly blocking or shielding the lenses or lens openings.

The improved loupe mounting is hereinafter more specifically described and is illustrated in the accompanying drawings in which Fig. 1 is a side elevational view of the present loupe mounting;

Fig. 2—a front elevational view thereof in association with a pair of spectacles depicted by dash lines, and Fig. 3—an isometric view of the device of Fig. 2.

In the drawings like numerals of reference indicate corresponding parts in the different figures.

In doted lines is shown a conventional pair of modern spectacles, of which 1—1 are the bows or temples, 2—2 the lens rims, 3—3 the lenses, and 4 the nose piece or bridge connecting the rims.

The present loupe mounting comprises a transverse supporting bar 5, whose underside is channeled to provide a pair of spaced depending flanges 7—7 bounding a channel 6. Each end of each flange 7 is provided with a depending cheek 7'. The cheeks 7' are shaped at their inner sides to follow the contour of the rim opening and to embrace between them the adjacent portion of the lens rim 2.

Extending forwardly from the bar 5 is an integral carrier member 8. To increase the strength and rigidity of the mounting, the carrier member 8 is preferably made angular in cross-section and gradually decreases in width towards its forward end. The wide rear end of the carrier member 8 provides a strong rigid connection with the supporting member 5.

Depending from the forward end of the carrier is a dual lens support 9 having a lens seat 10 formed in each end. The surfaces of the lens support surrounding each lens seat are grooved to slidably receive the magnifying lenses 12. A brace 11 is provided between the lens support and carrier member as shown.

A visor-like projection 13 is provided in front of the lens support to shield and protect the magnifying lenses when the loupe mounting is laid down.

While the loupe mounting may be made of any suitable material, it is preferably formed of a lightweight plastic material of clear and transparent nature to permit the passage of light therethrough to eliminate as far as possible the danger of causing shadows when interposed between the light source and work.

The cheek pieces 7, at least, should also be made of soft plastic or the like to prevent them from scratching or scoring the spectacle lenses 3—3.

The plastic material will be of sufficiently springy nature to permit the walls 14 to be spread apart by the spectacle rims to resiliently grip said spectacle rims between them.

It will be seen that I have devised a loupe mounting which may be readily slipped on or off a pair of spectacles. The mounting is quite rigid and holds the magnifying lenses in proper position relative to the lens opening of the spectacles. The mounting is very light in weight and does not therefore produce any objectionable strain or discomfort in the wearing of the spectacles. Formed of clear transparent material, the danger of shadow casting is reduced to a minimum.

While the loupe mounting shown is of rigid non-collapsible construction, it will be evident, of course, that it may be constructed of a plurality of sections movable relative to one another to facilitate packing or storing.

What I claim as my invention is:

1. A loupe mounting attachment for use with spectacles comprising an elongated transverse member grooved longitudinally of one of its sides to provide flanges between which relatively widely spaced portions of a spectacle frame are adapted to be releasably gripped; a unitary carrier member formed of angular sheet material joined by one of its ends to the said transverse member and extending forwardly therefrom, the joint between the members having substantial length to preclude relative movement of the parts, and a support for dual lenses arranged at the forward end of the carrier member; it being adapted to hold the lenses immediately adjacent to each other to provide short range binocular vision.

2. A loupe mounting constructed as set forth in claim 1 wherein the carrier member is formed of a transparent substance to permit vision therethrough.

3. A loupe mounting attachment for use with spectacles comprising an elongated transverse member grooved longitudinally of one of its sides to provide flanges between which relatively widely spaced portions of a spectacle frame are adapted to be releasably gripped; dependant flange extensions at the ends of the transverse member adapted to releasably grip the end portions of the spectacles; a unitary carrier member of angular sheet material joined by one of its ends to the said transverse member and extending forwardly therefrom, the joint between the said members having substantial length to preclude relative movement of the parts, and a support for dual lenses arranged at the forward end of the carrier member; it being adapted to hold the lenses in proximity to each other to provide short-range binocular vision.

References Cited in the file of this patent

UNITED STATES PATENTS

| 1,723,475 | Esleck | Aug. 6, 1929 |
| 2,599,716 | May | June 10, 1952 |

FOREIGN PATENTS

| 328,179 | Great Britain | Apr. 24, 1930 |